United States Patent
de Montmorillon et al.

(12)

(10) Patent No.: US 6,614,973 B2
(45) Date of Patent: Sep. 2, 2003

(54) MONOMODE OPTICAL FIBER FOR OPTICAL FIBER CABLE TRANSMISSION NETWORKS WITH WAVELENGTH DIVISION MULTIPLEXING

(75) Inventors: Louis-Anne de Montmorillon, Paris (FR); Pascale Nouchi, Maisons Laffitte (FR); Ludovic Fleury, Bois d'Arcy (FR); Pierre Sillard, Le Chesnay (FR)

(73) Assignee: Alcatel, Paris (FR)

( * ) Notice: Subject to any disclaimer, the term of this patent is extended or adjusted under 35 U.S.C. 154(b) by 310 days.

(21) Appl. No.: 09/788,562

(22) Filed: Feb. 21, 2001

(65) Prior Publication Data

US 2001/0022883 A1 Sep. 20, 2001

(30) Foreign Application Priority Data

Feb. 24, 2000 (FR) .............................. 00 02316

(51) Int. Cl.$^7$ ................................. G02B 6/02
(52) U.S. Cl. ........................ 385/123; 385/124; 385/126; 385/127
(58) Field of Search ................ 385/123, 124, 385/126, 127

(56) References Cited

U.S. PATENT DOCUMENTS 6,396,987 B1 * 5/2002 de Montmorillon et al. . 385/123
6,453,101 B1 * 9/2002 Rousseau et al. ........... 385/123
6,496,631 B2 * 12/2002 Tsukitani et al. ........... 385/123
6,519,402 B2 * 2/2003 Aikawa et al. ............. 385/124

FOREIGN PATENT DOCUMENTS

| EP | 0 368 014 | 5/1990 |
| EP | 0 959 374 A12 | 11/1999 |
| WO | WO 97/33188 | 9/1997 |

OTHER PUBLICATIONS

Yanming Liu et al.: "Design and fabrication of locally dispersion–flattened large effective area fibers" Proceedings of the European Conference on Optical Communication, Sep. 20, 1998, XP002105704.

Yanming Liu et al.: "Design and fabrication of locally dispersion–flattened large effective area fibers" Proceedings of the European Conference on Optical Communication, Sep. 20, 1998, XP002105704.

* cited by examiner

Primary Examiner—Akm E. Ullah
Assistant Examiner—Jerry T Rahll
(74) Attorney, Agent, or Firm—Sughrue Mion, PLLC

(57) ABSTRACT

A monomode optical fiber in a cable for an optical fiber transmission network with wavelength division multiplexing and a utilization range extending from 1300 nm to 1625 nm, and presenting at a wavelength of 1550 nm:

dispersion C lying in the range 5 ps/nm.km to 11 ps/nm.km;
  a ratio of dispersion to dispersion slope lying in the range 250 nm to 370 nm; and
  a ratio of the square of the effective area over the chromatic dispersion slope greater than 80,000 $\mu m^4.nm^2.km/ps$.

21 Claims, 1 Drawing Sheet

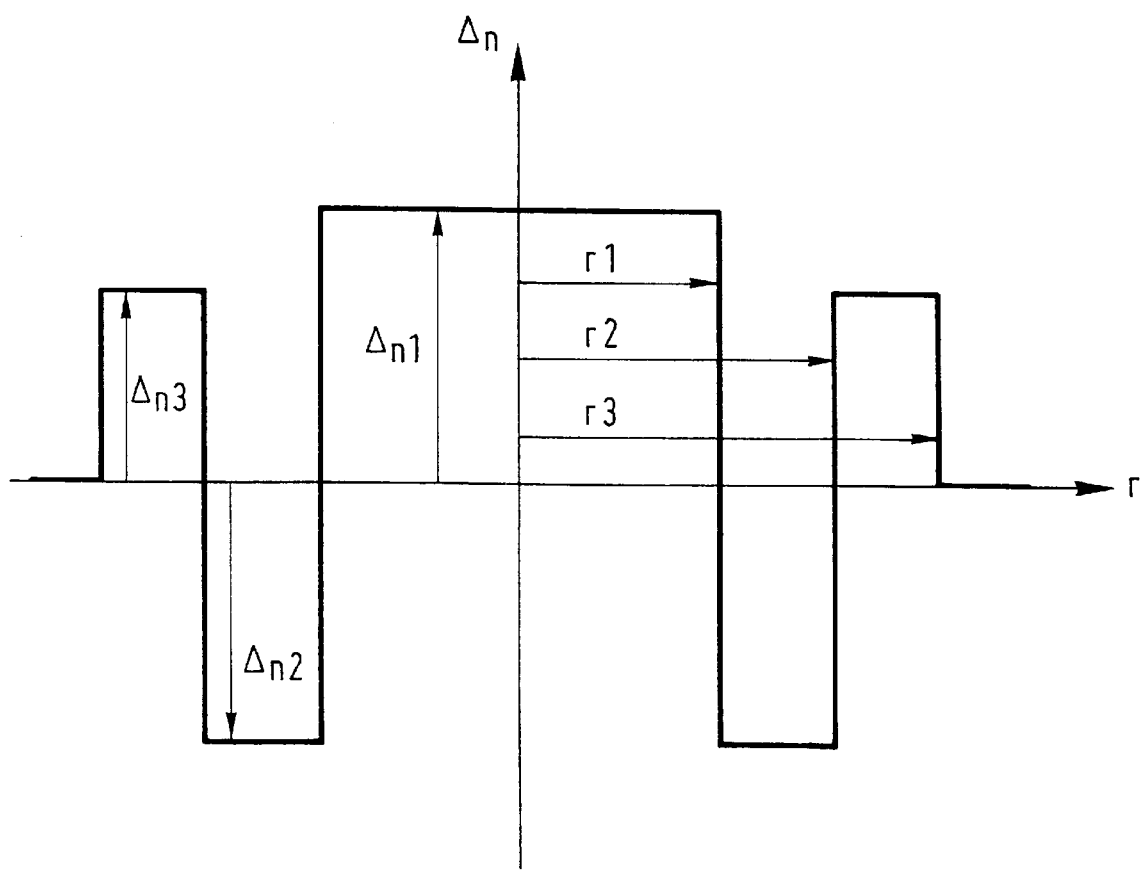

MONOMODE OPTICAL FIBER FOR OPTICAL FIBER CABLE TRANSMISSION NETWORKS WITH WAVELENGTH DIVISION MULTIPLEXING

The present invention relates to the field of optical fiber transmission, and more particularly to the field of wavelength division multiplexed transmission using a line fiber with offset dispersion.

BACKGROUND OF THE INVENTION

The index profile of an optical fiber is generally described in terms of the appearance of a graph where refractive index is plotted as a function of fiber radius. In conventional manner, the distance r to the center of the fiber is plotted along the abscissa and the difference between the refractive index and the refractive index of the fiber cladding is plotted up the ordinate. Thus, an index profile can be said to be "stepped", or "trapezium-shaped", or "triangular", depending on whether the graphs in question are respectively stepped, trapezium-shaped, or triangular. These curves generally represent an ideal or reference profile for the fiber, and fiber manufacturing constraints can lead to a profile that is perceptibly different.

In order to user a fiber in a transmission network, and in particular in a wavelength multiplexed transmission network, it is advantageous for the fiber to have a large effective area in the wavelength range of the multiplex. A large effective area makes it possible to limit power density within the fiber, for constant total power, and to limit or avoid undesirable non-linear effects.

For high rate networks, it is also advantageous for the fiber to provide monomode propagation of the channels in the multiplex. ITU-T G 650 defines the cutoff wavelength in a cable. The theoretical cutoff wavelength of a fiber is generally several hundreds of nanometers greater than its cutoff wavelength in a cable. It would appear that propagation in an optical fiber can be monomode even if the theoretical cutoff wavelength is greater than the wavelength of the signals used: for distances greater than a few meters or a few tens of meters, which is small compared with the distances over which propagation takes place in optical fiber transmission networks, secondary modes disappear because they are attenuated too strongly. Propagation in the transmission system is then monomode.

It is also important for the sensitivity of the fiber to bends and to microbends to be as small as possible. Sensitivity to bending is evaluated in the manner described in Recommendation ITU-T G 650, by measuring the attenuation that is caused by winding 100 turns of a fiber about a reel having a radius of 30 millimeters (mm). Sensitivity to microbending is measured is conventional manner; it can be done, as it is below, by measuring it relative to a fiber such as the fiber sold by the Applicant company under the reference ASMF 200.

In new transmission networks operating at high bit rates with wavelength division multiplexing, it is advantageous to limit the chromatic dispersion slope in the range of wavelengths used by the multiplex; the idea is to minimize distortions between channels of the multiplex during transmission.

The standard line fiber of the network, generally referred to as the SMF fiber has a dispersion wavelength that is zero around 1300 nanometers (nm), chromatic dispersion $C_{SMF}$ at 1550 nm of about 16 picoseconds per nanometer per kilometer (ps/nm/km) to 18 ps/nm/km, and a chromatic dispersion slope $C'_{SMF}$ at 1550 nm of about 0.055 ps/nm²/km to 0.062 ps/nm²/km.

The transmission network must necessarily have segments of dispersion compensating fiber (DCF) for compensating the chromatic dispersion and the chromatic dispersion slope of the SMF line fiber. A DCF fiber is disclosed, in particular in the article by Y. Akasaka et al., "Dispersion compensating technique of 1300 nm zero-dispersion SMF to get flat dispersion at 1550 nm range", Proc. 21st Eur. Cont. on Opt. Comm. (ECOC'95—Brussels), which DCF presents a compensation ratio lying in the range 92% to 108% for an SMF fiber in which $C_{SMF}$=16.3 ps/nm/km and $C'_{SMF}$=0.0617 ps/nm²/km, which corresponds to a ratio $C_{DCF}/C'_{DCF}$ lying in the range 235 nm to 287 nm.

There also exists DCF fibers sold by Lucent under the name "DK-modules" (DK-40; DK-60; DK-80) in which the compensation ratio lies in the range 80% to 120% for an SMF fiber in which $C_{SMF}$=17 ps/nm/km and $C'_{SMF}$=0.0055 ps/nm²/km, corresponding to a $C_{DCF}/C'_{DCF}$ ratio lying in the range 250 nm to 370 nm.

The technical problem which arises is that a transmission network comprising an SMF line fiber and a DCF fiber of the above type requires the DCF fiber to be of great length, thereby giving rise to a large amount of attenuation and to high cost.

OBJECTS AND SUMMARY OF THE INVENTION

The invention thus seeks to replace the SMF line fiber with a fiber that is capable of being accurately compensated in terms of dispersion C and dispersion slope C' by a short length of DCF fiber of the above type, and to do over a wide utilization range.

Although, a priori, a fiber with more or less constant dispersion (i.e. having zero dispersion slope) over the entire utilization range might be appropriate, that cannot be achieved in practice since the effective area decreases with dispersion slope and would therefore become too small to avoid the above-mentioned undesirable non-linear effects.

Nor do presently known dispersion-shifted fibers (DSFs) and non-zero dispersion-shifted fibers (NZDSFs) enable the above compromise to be resolved.

The present invention provides a monomode optical fiber for an optical fiber cable transmission network with wavelength division multiplexing and a utilization range extending from 1300 nm to 1625 nm, having a zero dispersion wavelength less than or equal to 1370 nm, and presenting at a wavelength of 1550 nm:

dispersion C lying in the range 5 ps/nm.km to 11 ps/nm.km;
a ratio of dispersion to dispersion slope lying in the range 250 nm to 370 nm;
an effective area of not less than 50 square micrometers ($\mu m^2$); and
a ratio of the square of the effective area over the chromatic dispersion slope greater than 80,000 $\mu m^4.nm^2.km/ps$.

The theoretical cutoff wavelength of the fiber is preferably less than 1.8 $\mu m$, since the cutoff wavelength of the cabled fiber needs to be less than 1.3 $\mu m$.

The fiber of the invention can be used advantageously outside the utilization range of the DCF just like an SMF fiber. It is therefore entirely possible to envisage using it in the transparent band of silica which lies in the range 1300 nm to 1625 nm.

The fiber of the invention presents properties that are most advantageous in terms of bending losses. Thus, at 1550 nm its bending losses are less than or equal to $10^{-2}$ decibels (dB)

for 100 turns of fiber on a reel of 30 mm radius; at 1625 nm this value is 0.5 dB. Similarly, at 1550 nm its bending losses are less than or equal to 100 dB/m when wound about a radius of 10 mm; at 1625 nm, this value is 400 dB/m.

The microbending sensitivity at 1550 nm (which is evaluated here relative to the microbending sensitivity of a standard fiber sold by the Applicant under the name ASMF 200), the fiber of the invention presents microbending sensitivity of less than 1, and preferably of less than 0.8.

At 1550 nm, the optical fiber of the invention preferably presents a chromatic dispersion slope C' lying in the range 0.01 ps/nm².km to 0.04 ps/nm².km, chromatic dispersion C lying in the range 7 ps/nm.km to 11 ps/nm.km, and an effective area lying in the range 50 $\mu m^2$ to 70 $\mu m^2$.

In a preferred embodiment, the fiber of the invention has a step-ring profile with the following preferred geometrical characteristics:

the difference $\Delta n$ between the index of the step of the fiber and the index of its cladding lies in the range $5.9 \times 10^{-3}$ to $8.2 \times 10^{-3}$;

the difference $\Delta n_3$ between the index of the ring and the index of the cladding lies in the range $0.9 \times 10^{-3}$ to $7.6 \times 10^{-3}$;

the difference $\Delta n_2$ between the index of the intermediate segment between the step and the ring, and the index of the cladding lies in the range $-6.8 \times 10^{-3}$ to $-1.7 \times 10^{-3}$;

the radius $r_1$ of the step lies in the range 3 $\mu m$ to 4.5 $\mu m$;

the inside radius of the ring, $r_2$, lies in the range 5.3 $\mu m$ to 8.1 $\mu m$; and the outside radius of the ring, $r_3$, lies in the range 7.3 $\mu m$ to 11.1 $\mu m$.

The invention also provides an optical fiber transmission network with wavelength division multiplexing that has the fiber of the invention as its line fiber for use in a range extending from 1300 nm to 1625 nm.

Such a transmission network also comprises dispersion compensating fiber having dispersion $C_{DCF}$ and a dispersion slope $C'_{DCF}$ such that the ratio $[C/C_{DCF}:C'/C'_{DCF}]$ lies in the range 0.8 to 1.2 and is preferably close to 1.

BRIEF DESCRIPTION OF THE DRAWING

Other characteristics and advantages of the present invention will appear on reading the following description of an embodiment given purely by way of non-limiting illustration.

The sole FIGURE shows in highly diagrammatic manner the step-ring type index profile of a fiber of the invention.

MORE DETAILED DESCRIPTION

Radius r is plotted along the abscissa in microns and index difference $\Delta n$ relative to the cladding is plotted up the ordinate.

Table 1 below gives the geometrical characteristics $r_i$ and $\Delta n_i$ for i lying in the range 1 to 3 in respect of 12 fibers given references A to J.

TABLE 1

| N° | r1 ($\mu$m) | r2 ($\mu$m) | r3 ($\mu$m) | $\Delta$n1 ($10^3$) | $\Delta$n2 ($10^3$) | $\Delta$n3 ($10^3$) |
|---|---|---|---|---|---|---|
| A | 3.69 | 6.02 | 7.77 | 6.91 | −5.18 | 3.8 |
| B | 3.56 | 5.74 | 10.94 | 7.1 | −6.39 | 1.06 |
| C | 3.9 | 6.16 | 8.21 | 6.71 | −6.37 | 4.7 |
| D | 3.68 | 6.31 | 10.52 | 6.99 | −4.55 | 2.1 |
| E | 4.19 | 6.99 | 9.32 | 6.2 | −5.27 | 4.65 |
| F | 4.24 | 6.6 | 9.43 | 6.32 | −5.37 | 3.79 |
| G | 4.13 | 6.74 | 8.7 | 6.08 | −3.65 | 4.26 |
| H | 3.94 | 6.41 | 9.86 | 6.5 | −4.87 | 1.95 |
| I | 3.67 | 6.48 | 8.64 | 7.24 | −5.79 | 5.79 |
| J | 3.62 | 6.09 | 7.61 | 6.97 | −4.88 | 3.83 |

Table 2 gives the propagation characteristics at 1550 nm for the fibers A to J, namely:

effective surface area Seff ($\mu m^2$);

chromatic dispersion C (ps/nm/km);

sensitivity to microbending S$\mu$c (no units);

chromatic dispersion slope C' (ps/nm²/km);

the ratio Seff²/C' slope ($\mu m^4$.nm².km/ps); and the ratio C/C' (nm).

TABLE 2

| No. | Seff ($\mu m^2$) @ 1.55 $\mu m$ | Dispersion C (ps/nm/km) @ 1.55$\mu m$ | S$\mu$c @ 1.55 $\mu m$ | C slope (ps/nm²/km) @ 1.55 $\mu m$ | $\lambda$c ($\mu m$) | $\lambda$o (nm) |
|---|---|---|---|---|---|---|
| A | 52 | 8 | 0.7 | 0.031 | 1.40 | 1360 |
| B | 51 | 8 | 0.6 | 0.032 | 1.63 | 1360 |
| C | 55 | 8 | 0.7 | 0.030 | 1.63 | 1350 |
| D | 51 | 8 | 0.6 | 0.023 | 1.80 | 1340 |
| E | 60 | 11 | 0.7 | 0.032 | 1.80 | 1320 |
| F | 62 | 11 | 0.5 | 0.037 | 1.80 | 1330 |
| G | 65 | 11 | 0.7 | 0.044 | 1.63 | 1340 |
| H | 54 | 11 | 0.7 | 0.032 | 1.63 | 1320 |
| I | 51 | 5 | 0.6 | 0.017 | 1.80 | 1370 |
| J | 50 | 8 | 0.8 | 0.031 | 1.30 | 1360 |

| No. | PC 10 mm (dB/m) @ 1.55 $\mu m$ | PC 30 mm (dB) @ 1.55$\mu m$ | PC 10 mm (dB/m) @ 1.625 $\mu m$ | PC 30 mm (dB) @ 1.625 $\mu m$ | Seff²/C' slope ($\mu m^4$.nm.km/ps) @ 1.55 $\mu m$ | C/C' (nm) @ 1.55 $\mu m$ |
|---|---|---|---|---|---|---|
| A | 13 | $10^{-5}$ | 60 | $10^{-3}$ | $8.5 \cdot 10^4$ | 260 |
| B | 8 | <$10^{-5}$ | 40 | <$10^{-3}$ | $7.9 \cdot 10^{-3}$ | 250 |
| C | 11 | <$10^{-5}$ | 46 | <$10^{-3}$ | $1.0 \cdot 10^5$ | 270 |
| D | 11 | <$10^{-5}$ | 53 | <$10^{-3}$ | $1.1 \cdot 10^5$ | 350 |

TABLE 2-continued

| | | | | | | |
|---|---|---|---|---|---|---|
| E | 17 | $<10^{-5}$ | 66 | $<10^{-3}$ | $1.1 \cdot 10^5$ | 340 |
| F | 7 | $<10^{-5}$ | 28 | $<10^{-3}$ | $1.0 \cdot 10^5$ | 300 |
| G | 11 | $<10^{-5}$ | 40 | $<10^{-3}$ | $9.7 \cdot 10^4$ | 250 |
| H | 14 | $10^{-5}$ | 62 | $10^{-3}$ | $9.2 \cdot 10^4$ | 340 |
| I | 9 | $<10^{-5}$ | 44 | $<10^{-3}$ | $1.6 \cdot 10^5$ | 290 |
| J | 12 | $2 \times 10^{-5}$ | 53 | $2 \times 10^{-3}$ | $8.1 \times 10^4$ | 260 |

In addition, Table 2 specifies:

bending losses PC at 1550 nm and at 1625 nm, expressed in dB for 100 turns of fiber on a 30 mm radius reel, or expressed in dB/m for a fiber wound about a radius of 10 mm;

the cutoff wavelength $\lambda_c$ (μm); and the zero dispersion wavelength $\lambda_0$ (μm).

As shown in Table 2, all of the fibers of the invention are very good at satisfying the criteria for bending and microbending losses.

In addition, given the value of the C/C' ratio lying in the range 250 nm to 370 nm for fibers of the invention, they are particularly well suited to the DCF fibers of transmission networks.

By way of example:

In a state of the art transmission system using 100 km of SMF fiber compensated by 17 km of DCF fiber, the following characteristics apply:

$C_{SFM}$=16.3 ps/nm/km; $C'_{SMF}$=0.0617 ps/nm²/km; $C_{DCF}/C'_{DCF}$=260; $C_{DCF}$=−100 ps/nm/km.

In a system of the invention using fiber No. C of Tables 1 and 2 to replace the SMF fiber, in which: C=7.9 ps/nm²/km; C'=0.03 ps/nm²/km; C/C'=260 nm; only 7.9 km of DCF are needed to obtain the same compensation in terms of dispersion and slope; in other words the length of the DCF fiber is reduced by a factor of 2.15 by using a line fiber of the invention.

In addition to the properties described above, the fiber of the invention presents attenuation at 1550 nm that is less than or equal to 0.24 dB/km and it presents polarization mode dispersion that is less than or equal to 0.1 ps/√km.

Naturally, other types of profile satisfying the above characteristics could be envisaged, in particular profiles of the trapezium-ring type.

What is claimed is:

1. A monomode optical fiber for an optical fiber cable transmission network with wavelength division multiplexing and a utilization range extending from 1300 nm to 1625 nm, having a zero dispersion wavelength less than or equal to 1370 nm, and presenting at a wavelength of 1550 nm:

dispersion C lying in the range 5 ps/nm.km to 11 ps/nm.km;

a ratio of dispersion to dispersion slope lying in the range 250 nm to 370 nm;

an effective area of not less than 50 μm²; and a ratio of the square of the effective area over the chromatic dispersion slope greater than 80,000 μm⁴.nm².km/ps.

2. An optical fiber according to claim 1, wherein the theoretical cutoff wavelength is less than or equal to 1.8 μm.

3. An optical fiber according to claim 1, wherein, at 1550 nm, its bending losses are less than or equal to $10^{-2}$ dB for 100 turns of fiber wound on a reel having a radius of 30 mm.

4. An optical fiber according to claim 1, wherein at 1625 nm, its bending losses are less than or equal to 0.5 dB for 100 turns of fiber wound on a reel having a radius of 30 mm.

5. An optical fiber according to claim 1, presenting, at 1550 nm, bending losses that are less than or equal to 100 dB/m when wound on a radius of 10 mm.

6. An optical fiber according to claim 1, presenting, at 1625 nm, bending losses that are less than or equal to 400 dB/m when wound about a radius of 10 mm.

7. An optical fiber according to claim 1, wherein the chromatic dispersion slope at 1550 nm lies in the range 0.01 ps/nm².km to 0.04 ps/nm².km.

8. An optical fiber according to claim 1, wherein the chromatic dispersion at 1550 nm lies in the range 7 ps/nm.km to 11 ps/nm.km.

9. An optical fiber according to claim 1, wherein the effective area at 1550 nm lies in the range 50 μm² to 70 μm².

10. An optical fiber according to claim 1, presenting a step-ring type profile.

11. An optical fiber according to claim 10, wherein the difference Δn between the index of the step of the fiber and the index of its cladding lies in the range $5.9 \times 10^{-3}$ to $8.2 \times 10^{-3}$.

12. An optical fiber according to claim 10, wherein the difference $\Delta n_3$ between the index of the ring and the index of the cladding lies in the range $0.9 \times 10^{-3}$ to $7.6 \times 10^{-3}$.

13. An optical fiber according to claim 10, wherein the difference $\Delta n_2$ between the index of the intermediate segment between the step and the ring, and the index of the cladding lies in the range $-6.8 \times 10^{-3}$ to $-1.7 \times 10^{-3}$.

14. An optical fiber according to claim 10, wherein the radius $r_1$ of the step lies in the range 3 μm to 4.5 μm.

15. An optical fiber according to claim 10, wherein the inside radius of the ring, $r_2$, lies in the range 5.3 μm to 8.1 μm.

16. An optical fiber according to claim 10, wherein the outside radius of the ring, $r_3$, lies in the range 7.3 μm to 11.1 μm.

17. An optical fiber according to claim 1, wherein its attenuation at 1550 nm is less than or equal to 0.24 dB/km.

18. An optical fiber according to claim 1, wherein its polarization mode dispersion is less than or equal to 0.1 ps/√km.

19. An optical fiber transmission network with wavelength division multiplexing using the fiber according to claim 1 as its line fiber.

20. An optical fiber transmission network according to claim 19, further comprising a dispersion compensation fiber having dispersion $C_{DCF}$ and dispersion slope $C'_{DCF}$ such that the ratio [$C/C_{DCF}$:$C'/C'_{DCF}$] lies in the range 0.8 to 1.2.

21. An optical fiber transmission network according to claim 20, wherein said ratio is close to 1.

* * * * *